US008533052B1

(12) United States Patent
Rajyaguru et al.

(10) Patent No.: US 8,533,052 B1
(45) Date of Patent: Sep. 10, 2013

(54) METHOD FOR EXPOSING RESEARCH NOTE DATA BASED UPON USER ACTIVITY DATA

(75) Inventors: Sameer R. Rajyaguru, Bellevue, WA (US); Terrence R. Nightingale, Marysville, WA (US); Marvin M. Theimer, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 226 days.

(21) Appl. No.: 12/950,861

(22) Filed: Nov. 19, 2010

(51) Int. Cl.
*G06Q 30/00* (2012.01)
(52) U.S. Cl.
USPC .......................................... 705/26.1; 705/27.1
(58) Field of Classification Search
USPC ............................................... 705/26.1, 27.1
See application file for complete search history.

(56) References Cited

U.S. PATENT DOCUMENTS

| | | | |
|---|---|---|---|
| 7,539,632 B1 * | 5/2009 | Chakrabarti et al. | 705/26.1 |
| 7,664,669 B1 | 2/2010 | Adams et al. | |
| 7,680,703 B1 | 3/2010 | Smith | |
| 7,720,723 B2 | 5/2010 | Dicker et al. | |
| 7,752,077 B2 | 7/2010 | Holden et al. | |
| 7,813,965 B1 | 10/2010 | Robinson et al. | |
| 7,831,548 B1 | 11/2010 | Round et al. | |
| 8,108,255 B1 * | 1/2012 | Robinson et al. | 705/14.44 |
| 8,447,643 B2 * | 5/2013 | Barnes | 705/7.29 |
| 2009/0307100 A1 * | 12/2009 | Nguyen et al. | 705/26 |

OTHER PUBLICATIONS

Building Internet applications through technology. Litvak, Michael, Clare, Jeremy. New Telecom Quarterly5. 4 (Fourth Quarter 1997): 23-31, downloaded from ProQuestDIrect on the Internet on Jan. 22, 2013, 5 pages.*
"Comparison-pricing Web sites mean holiday gift buying isn't mall or nothing" Kumler, Emily. Knight Ridder Tribune Business News [Washington] Nov. 22, 2004: 1. Downloaded from ProQuestDirect on the Internet on May 22, 2013, 3 pages.*
U.S. Appl. No. 12/165,254, filed Jun. 30, 2008, owned by the assignee of the present application (filing receipt, specification and drawings submitted).

* cited by examiner

*Primary Examiner* — James Zurita
(74) *Attorney, Agent, or Firm* — Knobbe, Martens, Olson & Bear, LLP

(57) ABSTRACT

Comparative decision systems and methods are disclosed for gathering and mining data representative of purchase decisions. One disclosed comparative decision system detects when a user is comparing items and provides the user with the ability to create a research note storing comparative information for the alternative items. The system displays information about items according to a variety of factors. The user can customize the factors and enter information for each alternative item according to the various factors. Some information may be pre-populated by the system. The research note may be made visible to other users, and may be suggested to another user based on the note's expected helpfulness and relevance to that user. One disclosed method for mining data stored within research notes identifies which factors are given higher relative priorities by users considering a purchase. Another mining method analyzes the effects of price changes on item popularity.

10 Claims, 13 Drawing Sheets

FIG. 3

Tom's New TV Research Note (rename)

Make My Note Visible To Others
- ● Now
- ○ After I Purchase an Item
- ○ Never

Edit My Note: _25_

| Key? | Criteria | Item: Sony Bravia KDL-40V3000 | Panasonic TC-L42U22 HDTV | Panasonic TC-L42U22 HDTV | Sony KDL-40V2500 Bravia LCD HDTV |
|---|---|---|---|---|---|
| ☐ | List Price | ~~$1899.99~~ | ~~$1899.99~~ | ~~$1899.99~~ | ~~$1899.99~~ |
| ☑ | Price | $1400.24 | $1431.04 | Click to see price | $1380.85 |
| ☐ | You Save | $499.75 | $468.95 | Click to see price | $519.14 |
| ☑ | Shipping | Free (Ground) | Free (Ground) | $25.95 (Ground) | Free (2-day) |
| ☑ | Avg. Rating | | | | |
| ☐ | Availability | In Stock | 1-2 weeks | In Stock | In Stock |
| ☑ | Resolution | 1080p | 720p | 1080p | 1080p |
| ☐ | Refresh Rate | 240Hz | 240Hz | 120Hz | 120Hz |
| ☐ | Matches my media cabinet? | No-Red border may clash | Yes - thin bezel | Yes | Unsure |
| ☐ | Inputs | 3 HDMI, 2 Component, VGA, S-Video | 3 HDMI, 2 Component, VGA, S-Video | 4 HDMI, 3 Component, VGA | 2 HDMI, 3 Component, VGA, S-Video |
| ☐ | Weight | 35 lbs. | 31 lbs. | 31 lbs. | 31 lbs. |
| ☐ | Dimensions | 32x8.8x23in. | 31.1x9.0x22in. | 33.5x9x25.1in. | 31.5x8.6x21.7in. |
| ☐ | Notes | This model just came out. | My neighbor Joe has this - looks great! | Might be too big for my cabinet | one review said it can run fairly hot. |
| (add criteria) _23_ | | | | | |
| (edit current criteria) _24_ | | | | | |

}_73_

My Comments: I've been looking at getting a new TV since June 2010 and read some helpful reviews in Consumer Reports' May 2010 issue. }_74_

[ Delete Note ]   [ Save Changes ]

*FIG. 4*

Tom's New TV Research Note    14 of 19 people found this note helpful  26

Was this note helpful? yes no    27    Last updated: September 19, 2010

| Key? | Criteria | Item: Sony Bravia KDL-40V3000 | Panasonic TC-L42U22 HDTV | Panasonic TC-L42U22 HDTV | Sony KDL-40V2500 Bravia LCD HDTV |
|---|---|---|---|---|---|
| ☐ | List Price | $1899.99 | $1899.99 | $1899.99 | $1899.99 |
| ☑ | Price | $1400.24 | $1431.04 | Click to see price | $1380.85 |
| ☐ | You Save | $499.75 | $468.95 | Click to see price | $519.14 |
| ☑ | Shipping | Free (Ground) | Free (Ground) | $25.95 (Ground) | Free (2-day) |
| ☑ | Avg. Rating | | | | |
| ☐ | Availability | In Stock | 1-2 weeks | In Stock | In Stock |
| ☑ | Resolution | 1080p | 720p | 1080p | 1080p |
| ☐ | Refresh Rate | 240Hz | 240Hz | 120Hz | 120Hz |
| ☐ | Matches my media cabinet? | No-Red border may clash | Yes - thin bezel | Yes | Unsure |
| ☐ | Inputs | 3 HDMI, 2 Component, VGA, S-Video | 3 HDMI, 2 Component, VGA, S-Video | 4 HDMI, 3 Component, VGA | 2 HDMI, 3 Component, VGA, S-Video |
| ☐ | Weight | 35 lbs. | 31 lbs. | 31 lbs. | 31 lbs. |
| ☐ | Dimensions | 32x8.8x23in. | 31.1x9.0x22in. | 33.5x9x25.1in. | 31.5x8.6x21.7in. |
| ☐ | Notes | This model just came out. | My neighbor Joe has this - looks great! | Might be too big for my cabinet | one review said it can run fairly hot. |

73

Author's Comments: I've been looking at getting a new TV since June 2010 and read some helpful reviews in Consumer Reports' May 2010 issue.    74

Create My Research Note from this Note

*FIG. 5*

|  | Inputs | 3 HDMI, 2 Component VGA, S-Video | 3 HDMI, 2 Component VGA, S-Video | 4 HDMI, 3 Component, VGA | 2 HDMI, 3 Component VGA, S-Video |
|---|---|---|---|---|---|
| ☐ | Weight | 35 lbs. | 31 lbs. | 31 lbs. | 31 lbs. |
| ☐ | Dimensions | 32x8.8x23in. | 31.1x9.0x22in. | 33.5x9x25.1in. | 31.5x8.6x21.7in. |
| ☐ | Notes | This model just came out. | My neighbor Joe has this – looks great! | Might be too big for my cabinet | One review said it can run fairly hot. |

Author's Comments: I've been looking at getting a new TV since June 2010 and read some helpful reviews in Consumer Reports' May 2010 issue.

Others' Comments:

Similar Choices
September 20, 2010 By Alex Washington (Portland, OR) – See my notes I'm looking at the same options—let me know which one you pick!

I Like the Panasonic!
September 23, 2010 By Joe Green (Seattle, WA) – See my notes I purchased the Panasonic you're considering a few monhs ago and it's worked great.

[ Add your own comment ] —76

Tag Users Associate with This Research Note
Check the boxes next to the tags you consider relevant or enter your own tags in the field below.
☐ 1080p ☑ LCD ☑ HDTV ☑ 42 inch lcd   Your tags: [        ] [Add]

Similar Research Notes Which May Be Helpful: —77
 Watch Me Pick my LCD! by randomJoe82 – 91 of 108 people found this note helpful
 Hunting for the perfect HDTV by janetSue32 – 80 of 100 people found this note helpful
 A Christmas present to myself by skylarkDrivere – 5 of 17 people found this note helpful

Customer Discussions —78
 Active discussions in related forums          replies    last post
  How to pick the right 5.1 receiver?           55        17 mins. ago
  Wiring help!                                  21        1 hour ago
  When are the next Panasonic LCD's coming out? 37        4 days ago

*FIG. 6*

| | | | | | |
|---|---|---|---|---|---|
| September 2010 Tablets Research Note | | | 82 of 93 people found this note helpful | | |
| Was this note helpful? <u>yes</u> <u>no</u> | | | Last updated: September 27, 2010 | | |

| | | | | | |
|---|---|---|---|---|---|
| Item: | | Blackberry Playbook<br>[Add to cart] | Apple iPad 16GB WiFi<br>[Add to cart] | Samsung Galaxi<br>[Add to cart] | Dell Streak<br>[Add to cart] |
| Criteria | Importance | | | | |
| My Ranking | High | #4 | #2 | #1 | #3 |
| List Price | Low | not announced | $499 | not announced | $649 |
| Price | High | Not available | $499 | Not available | Not available |
| Screen size | High | 7 in. | 9.7 in. | 7 in. | 5 in. |
| Resolution | Medium | 1024 x 600 | 1024 x 768 | 1024 x 600 | 800 x 480 |
| Platform | Medium | BB Tablet OS | iOS 3.2.2 | Android 2.2 | Android 1.6 |
| Availability | Low | | Now | October | October |
| Adobe Flash? | Medium | 10.1 | Not Supported | 10.1 | Not Supported |
| Processor | Medium | 1GHz dual-core Cortex A9 | 1GHz Apple A4 (ARMv7) | 1GHz Cortex A8 | 1GHz Snapdragon |
| Graphics | Low | | PowerVR SGX 535 | PowerVR SGX 540 | Adreno 200 |
| RAM | Low | 1GB | 256MB | 512MB | 512MB |
| Storage | High | 16GB/32GB (?) | 16GB | 16GB/32GB | 512MB |
| Expansion | High | 16GB/32GB (?) | 16GB | 16GB/32GB | 512MB |
| Connections | Medium | 802.11 a/b/g/n, Bluetooth 2.1, 3G | 802.11 a/b/g/n, Bluetooth 2.1 | 802.11 b/g/n, Bluetooth 3.0,3G | 802.11 b/g, Bluetooth 2.1,3G |
| Frequently Bought With | | PlayBook Screen Protector<br>[Buy Both] | Leather iPad case<br>[Buy Both] | Galaxy Case + 2GB microSD<br>[Buy All 3] | Stream Case + 2 GB microSD<br>[Buy All 3] |
| Author's Comments | | Should I wait for a newly announced Android tablet, or buy an iPad now? Comments appreciated! | | | |

METHOD FOR EXPOSING RESEARCH NOTE DATA BASED UPON USER ACTIVITY DATA

BACKGROUND

Web-based customer reviews are frequently used by individuals in researching potential purchases. Customers who leave reviews are often themselves in the position of researching a variety of alternatives before deciding upon their eventual purchase. Potential customers, also referred to as users, may consider a number of alternative purchases and gather a variety of information to assist with their comparison and eventual decision. A user may consider a combination of factors, such as price, availability, features, and reviews (including their content and reliability), in making her purchase decision. Users' methods for keeping track of such comparisons can vary. Some users may mentally store and compare information about the alternatives under consideration. Others may use crude notes on paper, in a word processor or in a spreadsheet.

BRIEF DESCRIPTION OF THE DRAWINGS

The accompanying drawings, which are incorporated in and form a part of this specification, illustrate embodiments of the invention, wherein:

FIG. 3 illustrates one example of an interface allowing a user to select the initial set of items to compare in her research note, by presenting the user with her recently viewed items and items suggested by the system.

FIG. 4 illustrates one example of an interface for editing a research note.

FIG. 5 illustrates one example of an interface for viewing a research note.

FIG. 6 illustrates another example of an interface for viewing a research note, in which the viewer may also view others' comments associated with the research note and add his own comments.

FIG. 7 illustrates another example of an interface for viewing a research note, including convenient options to purchase compared items, and information concerning bundles in which the relevant items are commonly bought with.

DETAILED DESCRIPTION OF SPECIFIC EMBODIMENTS

Figure 1:
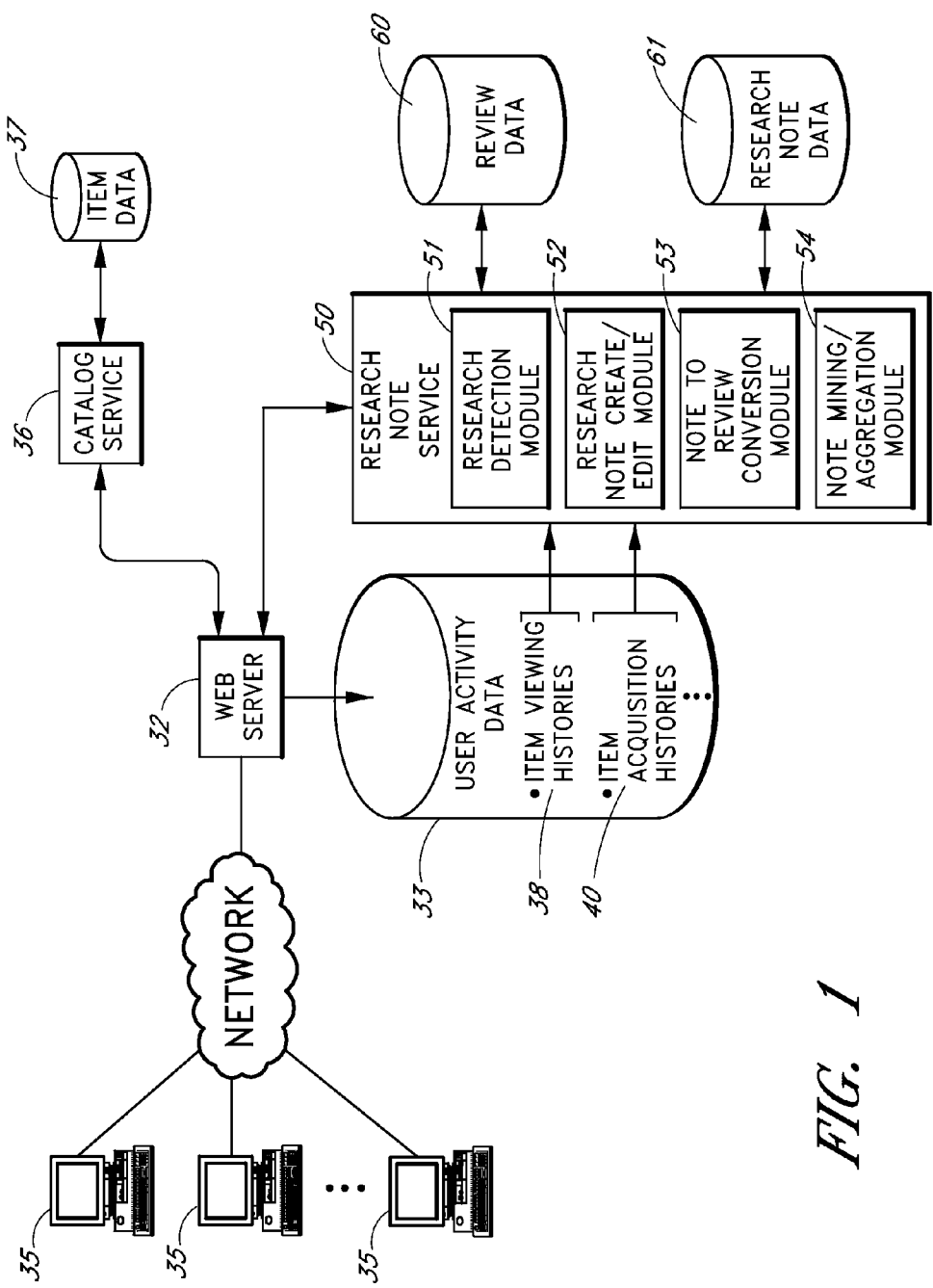
FIG. 1 depicts one embodiment of a research note system for enabling electronic catalog users to create and share research data.

Specific embodiments will now be described with reference to the drawings. These embodiments are intended to illustrate, and not limit, the claimed subject matter. Nothing in this detailed description is intended to imply that any particular feature, characteristic, or component of the disclosed systems and methods is essential Overview People tend to make a number of comparative decisions when selecting an item to purchase. In a common example, referring to FIG. 1, an electronic catalog user is a potential customer considering items being sold through the electronic catalog. There may be multiple items within the catalog which satisfy the user's criteria for purchase. Such items may be accessible through a catalog service 36 which accesses stored item data 37. In order to make the optimal purchasing decision, the user may identify the proper set of alternative items, gather relevant information differentiating the alternative items, prioritize the information according to various factors, and make a purchase decision according to the gathered and compared information.

This process is often iterative and non-linear, and may be distributed over a period of days, weeks, or longer. In the process of gathering information on the currently considered set of alternative items, the user may discover an item not previously considered. The user may be introduced to a new item which only recently became available, or may discover an item which her search strategy previously had not captured the item. Alternatively, in the process of researching her purchase, the user's preferences may change and an item which previously did not qualify as a candidate for purchase may now qualify. This can complicate the process of making a decision, and may lead to a non-optimal purchase, for example if the user fails to properly track and compare the various alternatives. The user may be overwhelmed by the number of factors differentiating the various alternatives, leading to a non-optimal purchase.

A research note system may provide users with a structured way to maintain and compare their research information, and may provide additional benefits which will be explained later. In order to provide such benefits, the system may present a user with the opportunity to create a research note, when for example, the user's behaviors evidence an intent to compare items. In one embodiment, a computer system, such as an online catalog system, maintains data of a user's browse history 33 such as item pages which have been viewed 38, items which have been acquired 40 and search queries submitted. A research notes system (also referred to herein as "the system") is disclosed that may store data representative of which catalog items are similar, or may be considered competing alternatives. Items may be organized into categories, and a user may be presumed to be viewing alternatives when the user views the details of a certain number of items within a particular category. For example, looking at three different television models may indicate that a user is considering purchasing a television. In another example, categories may be further organized into sub-categories. A user may be presumed to be viewing alternatives when, for example viewing televisions of a certain sub-category, such as liquid crystal display televisions, or televisions between 40 and 45 inches in diagonal size. Other factors may be considered in determining whether a user is researching alternative items for purchase. In one embodiment, if a user searches for a general term, such as "LCD HDTV" the system interprets that action as indicating that the user may be interested in creating a research note, for example because the user has searched for a term indicating a general category rather than a specific product model. Alternatively, a user's actions such as reading product reviews, reading existing research notes, or clicking a hyperlink on one product's page which links to a competing product may be considered to be factors indicating that a comparative decision is being researched.

FIG. 1 illustrates one example of a system in which electronic catalog users may create and share research data, and illustrates components for implementing the research note detection, creation, editing, conversion to review, and mining methods. In this particular embodiment, the items are catalog items represented in a browsable electronic catalog hosted by an Internet-accessible web site system. As will be apparent, the disclosed system is not limited to such an environment.

The system 30 includes a web server 32 that generates and serves web pages to computing devices 35 of end users. The computing devices 35 may, for example, include personal computers, personal digital assistants, mobile phones, set-top boxes for televisions, and other types of devices that run web browser software. The web server 32 may be implemented as any number of physical servers/machines that run web server software.

The web server 32 provides user access to an electronic catalog of items that are available via the system 30 for purchase, rental, or another form of "acquisition." The items may, for example, include consumer electronics products; household appliances; book, music and video titles in physical and/or downloadable form; magazine and other subscriptions; software programs; grocery items, and various other types of items that may be found in an electronic catalog. In a typical embodiment, many thousands or millions of unique items are represented in the catalog.

Detailed information about each item may be obtained by users by accessing the item's detail page within the catalog. To access an item's detail page in one embodiment, a user generally must either click on a description of the item (e.g., on a category page, search results page, or recommendations page), or submit a search query that uniquely identifies the item. Thus, a user's access to an item's detail page generally represents an affirmative request for information about the item. Each item detail page may provide an option for the user to purchase the item; add the item to a shopping cart, wish list, or rental queue; bid on the item; pre-order the item, and/or perform another type of acquisition-related action.

As depicted in FIG. 1, as users access the web site, various types of user actions are recorded in a repository of user activity data 33 (also referred to as "event data"). For example, each item detail page access event and each item acquisition event (e.g., purchase, rental or license) may be recorded. The events may be captured together with event metadata, such as user identifiers, time/date stamps, session identifiers, etc., that may be used for data mining. The event data may be maintained in any appropriate format or formats (e.g., log files, databases, etc.). In addition, different types of event data may be stored separately from others (e.g., in different databases, records, files, etc.).

Figure 9:
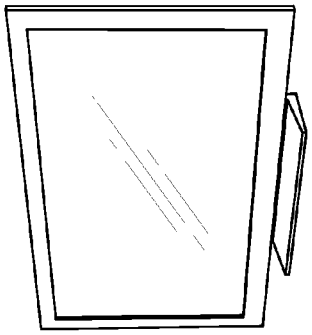
FIG. 9 illustrates one example of how research notes can be suggested to a user for viewing.

The web server 32 generates requested catalog pages dynamically in response to requests from the user devices 35. The item data included in the catalog pages (item description, price, availability, etc.) is retrieved from a catalog service 36, which accesses a repository 37 of item data. The content included in the catalog pages also includes various types of item association data retrieved from an research note service 50. For example, as is known in the art, the web server 32 may supplement item detail pages with lists of related items. These lists may be based on purchase-based associations (e.g., "customers who buy A also buy B and C"), view-based associations (e.g., "customers who view D also view E and F"), research-based associations (e.g., "customers who research G also research H and I"), and other types of item relationships. The item association data also includes pairwise comparison data and suggested item pairs or bundles, as known in the art. The item association data also includes research note data. FIG. 9, discussed below, illustrates an examples of how various types of item association data, including research note data and suggested item pairs, may be incorporated into catalog pages.

As further illustrated in FIG. 1, the research note service 50 includes a research detection module 51 that detects when a user is likely conducting research relevant to the research note system, for example comparing items which may be substitutes for each other. The research note service 50 also includes a research note create/edit module which creates and modifies research note data 61 relating to research notes. Both modules 51 and 52 operate by analyzing collected event history data 33, and particularly user-specific item viewing histories 38. They may also consider item acquisition histories 40. In one embodiment, the viewing histories are based on item detail page visits, and the item acquisition histories are based on purchase and/or other types of transactions that involve the payment of money to obtain access to an item. The research note service 50 also includes a note to review conversion module 53 which is used in the creation of review data 60 related to research note data 61. The research note service 50 also includes a note mining/aggregation module 54. Although various modules 51, 52, 53, and 54 are shown, these modules correspond to distinct web site features and any of these modules may be omitted in some embodiments.

In some cases, multiple versions or variations of a particular product may be treated as the same "item" for purposes of the analyses described herein. For example, the hardcover, paperback, audio, and/or electronic versions of a particular book title may be treated as the same item. (Stated differently, the book title may be treated as the item, regardless its format.) As another example, all color and/or memory-size variations of a particular Apple iPod model may be treated as the same item. All variations or versions of a product may, but need not, be described on a common item detail page for the product.

The catalog service 36 and the research note service 50 may each be implemented as a respective computer system that executes program code. Each such computer system may include any number of physical computers or machines, and may include computers that are geographically remote from one another. The various program modules may be stored on any type or types of computer storage system or computer-readable medium. The data repositories 33, 37, 60, and 61 shown in FIG. 1 may be implemented as databases, flat file systems, and/or other types of storage systems, and may include magnetic disks, solid-state memories, and/or other types of storage devices. More generally, each of the illustrated components 32, 33, 36, 37, 50, 60 and 61 may be implemented in any appropriate combination of computer hardware and software.

Although the research note service 50 is illustrated as part of a particular web site system in FIG. 1, it could alternatively be implemented as a separate web service that supplies content that is displayed on many different distinct web sites. In such embodiments, the servers of such web sites may send collected user activity data to the research note service 50 for analysis, and may send web service requests to the research note service to retrieve research note data. In such multi-site embodiments, the research notes and/or related mined research information optionally be generated based on aggregated user activity data collected by a number of distinct and independently operated web sites.

Although many of the embodiments described herein will discuss storing data and making determinations based upon a user's behavior within a single online resource, such as an online catalog, in another embodiment the system is capable of monitoring the user's behavior across a variety of online resources. For example, a web browser integrated toolbar 90 will be described later which allows for data collection on any page viewed through the web browser. The system may therefore have a number of factors indicating when a user is considering a comparative decision.

The system may also consider the time span during which the user's actions take place when deciding whether to present the user with the option to create a research note. For example, a user who views alternative products months apart may be considered less likely to be conducting research for a potential purchase than a user who views alternative products within a few days of each other. A user who views alternative products within the same online session may be considered even more likely to be conducting research for a potential purchase.

Once the system determines that the user is likely considering a comparative decision, the user can be presented with the option to create a research note. For example, referring to FIG. 2, which depicts an illustrative user interface for prompting a user to create a research note, the user is presented with an interface 70 which suggests the creation of a research note. Such a determination can be accomplished using a research detection module, referring to FIG. 1, 51 as part of a larger research note service 50. The research note service and associated modules can be implemented using any of a variety of computer programming languages. For example, the system may present the user with a web-based user interface screen for initiating the creation of a research note. This may be performed by a module capable of creating and editing research note data 52. The research note data may be stored in a data storage system 61 which may also store other data. The user interface could appear as a widget element within the existing webpage 70, as a pop-up window, or through some other presentation method. The user may then indicate a desire to create a research note, or that the user does not wish to create a research note. The system may provide the user with the option to decline further invitations to create research notes, to request that invitations be presented less frequently, or to specify other research note creation preferences.

Figure 2:
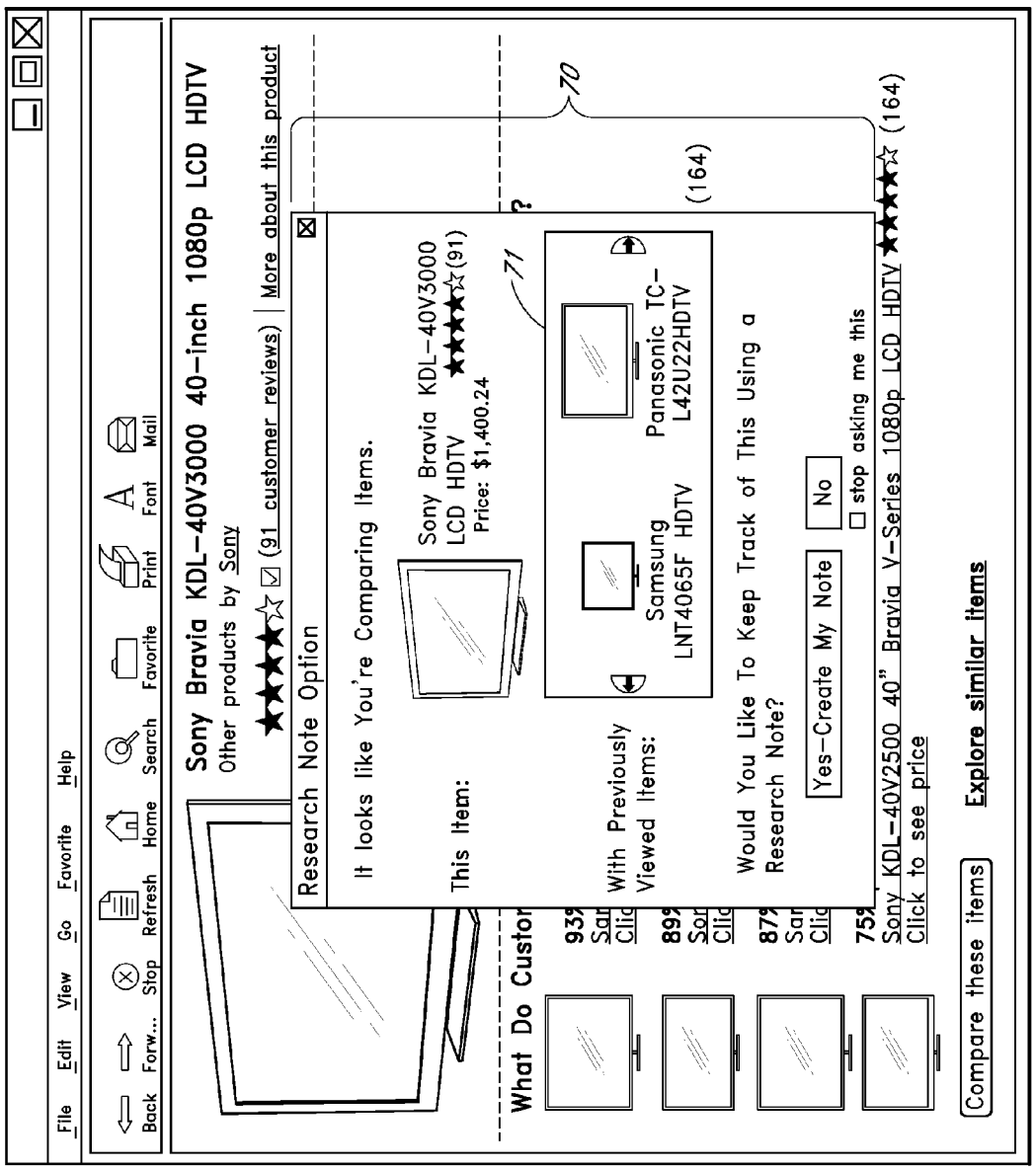
FIG. 2 illustrates one example of how a user may be prompted to create a research note to store the user's research decision data, once the system has detected that the user appears to be comparing alternative items.

In the example of FIG. 2, the user is shown information concerning why the prompt is being presented, such as the item currently being viewed and items previously viewed which may be substitutes. The system presents the user with a set of options, including the ability to create a research note, to not create a research note, and to request that further prompts to create research notes do not occur (shown in the FIG. 2 example checkbox of "stop asking me this").

In presenting the user with the option to create a research note, the system may provide the user with information indicating why they are being offered the option 70. In one example, when the user views the third television during one month's time, the online catalog website displays a window explaining that based upon recent activity, it appears that the user is comparing the identified television models. As illustrated in FIG. 2, the system may provide the user with the alternative models' images and names, which may remind the user of the models which she has previously viewed, and encourage the user to begin a research note to assist with comparing those past models to the item currently being viewed.

In another embodiment, users are provided with the ability to create a research note by their own initiative. For example, a website's menu options or buttons may present the user with the ability to begin a new research note.

Although the research note system is often described in terms of users considering potential items for purchase, the invention is not limited to such embodiments. For example, the system may additionally or alternatively enable users to create and share research notes for other types of actions, such as travel-related items (destinations, activities, accommodations, or tour groups, etc.), social network members, Really Simple Syndication ("RSS") feeds to follow, political candidates or issues to compare, television shows, restaurants, web sites, blogs, authors, musical groups, videos and/or podcasts.

Figure 3:
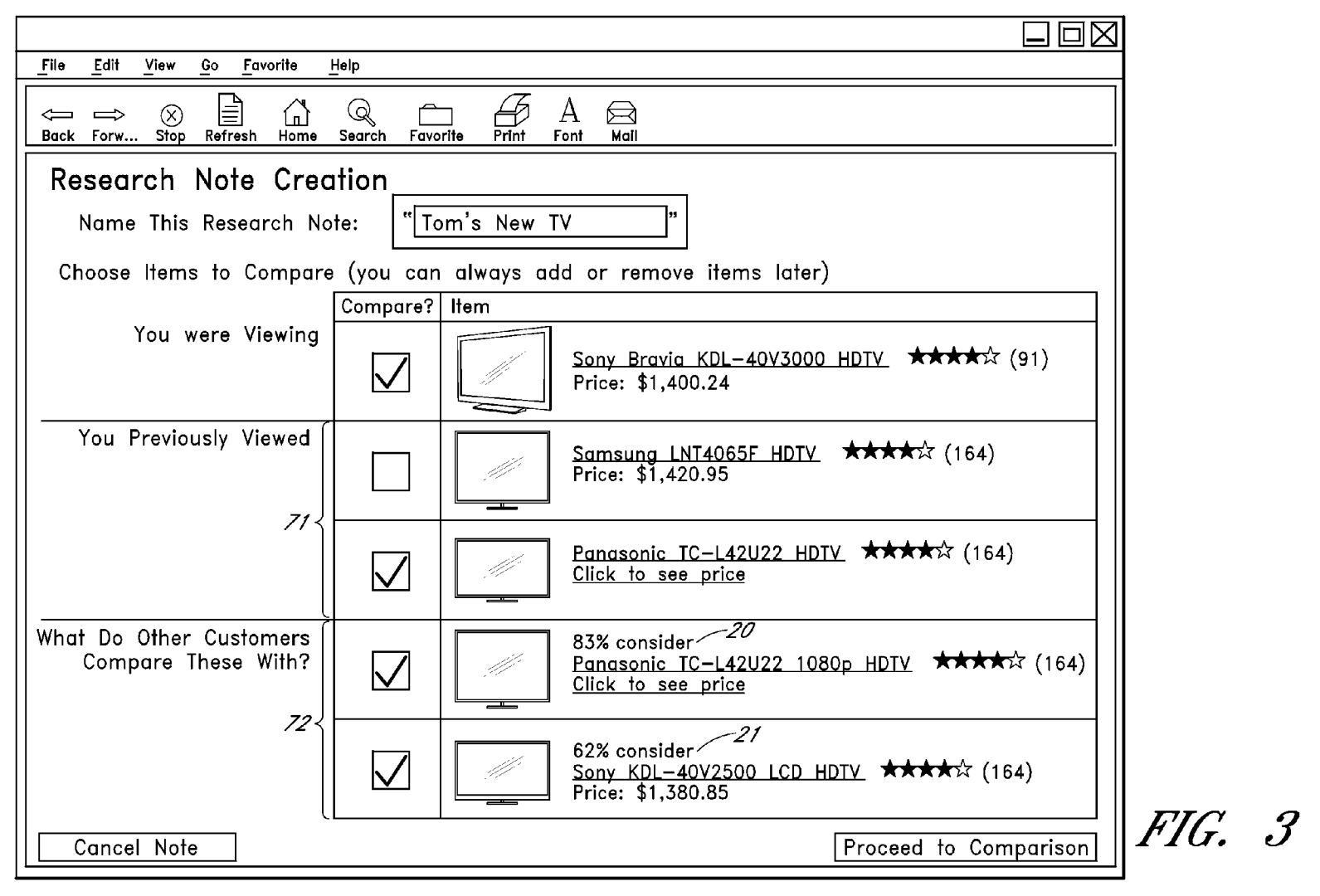

Once the user has chosen to create a research note, the note may be populated with information such as alternative items which the note compares, factors to use in comparing the items, values for particular item-factor combinations, and general information such as the user's narrative concerning the decision making process. The system may provide the user with convenient ways of selecting items to compare within the note. Upon choosing to create a research note, the user may be provided with an interface, such as a note-building webpage, which shows the user simplified representations of suggested items for comparison. Items may be identified by name and/or image. For example, referencing FIG. 3, items which the user has recently viewed 71, which may have been taken into account in prompting the user to create the note, may be displayed as suggested items for comparison. The system presents the item most recently viewed by the user, and items previously viewed which may be substitutes 71. The system also presents items which other customers have compared the above items with 72. This information may be based on existing research note data. The system presents information summarizing aggregated research note data to inform the user that 83% of other customers 20 have compared the items which the user has been considering to a particular model, and that 62% of other users 21 have made similar comparisons to a different model. The interface presents check-box interfaces by which the user may select items to compare in the research note, presents an area where data corresponding to a name for the research note may be entered, and allows the user to proceed to providing comparison data for the research note, or to cancel the creation of the research note.

The system may also suggest other items for comparison 72. Such suggestions may be based upon data stored within the system, such as data regarding which items are the most popular within the compared items' category, or which items were considered by other users who compared or purchased the recently viewed items. The system may present information concerning the popularity of the suggested items 20, 21, for example stating "52% of users comparing one of these items also compared . . . ", "the current #1 best-selling item from this item category is . . . " or "83% consider" 20. Such information could be useful to users in quickly evaluating which items they may wish to compare. The system may provide an option for the user to select those items to be compared within the research note. For example, each item may have a user-selectable check-box item next to it, so that the user can select the items to compare. In an alternate interface, the user may drag and drop possible items for comparison from one area of the screen, such as a "recently viewed items" area, into another area, such as the header row for an item-comparison grid interface. Such drag-and-drop functionality may, for example, be implemented in JavaScript or other script coding of web pages. The system may provide the user with the ability to edit the list of items being compared after the initial note creation process, so that she can later add or remove items.

In addition to selecting items comparison, the user may also be presented with the ability to select factors for comparison. Referring to FIG. 4, an example of an interface for editing a research note is shown. Such an interface may be transmitted to the user during the process of initially creating the research note, and may also be transmitted to the user during subsequent editing of an existing research note. Factors, such as criteria can organize comparison information. Factors can include list price, current price, shipping cost, availability, average review popularity, number of reviews, release date, warranty, or more product-specific features such a television's screen size, resolution, refresh rate, inputs, tuners, power consumption, weight, and dimensions. In one embodiment, some factors, such as price, may be included for comparison by default. A user may be presented with a list of factors based upon data items extracted from item data, or factors which are considered common for the categories in which the considered items appear. Factors may also be recommended by the system based on which factors are frequently considered by other users, or which factors other users tend to list as being of high importance in their research notes or reviews. The user may also be presented with the ability to define her own factors 23, such as by simply entering text into the first cell within a row corresponding to the factor, thereby giving the factor a name. A general factor, such as a "Notes" factor 73, may be presented or automatically included so that the user can keep track of item-specific notes which might not fit within the defined factors. Additionally or alternatively, a research note may contain a generic "notes" or "comments" area for storing information not specific to any item and/or factor 74. The system may provide users with the ability to add 23, remove, and/or edit 24 factors after they have initially been defined, so that users can refine their comparison to better suit their evolving decision making process. Factors may be rearranged by the user. The system can record data indicating that the note is to be made visible 25 at approximately the time such data is recorded, is to be made visible at approximately the time that a compared item is purchased, or is not to be made visible.

Once the system has stored data relating to items selected for comparison and factors selected to use in comparing the items, the system can store data corresponding to the various item-factor combinations. For example, in Table 1, three televisions Models A, B, and C are being considered according to factors Price, Screen Size, Resolution, "Looks Good" and Notes. As a result, there are fifteen item-factor combinations to be populated. The system may be capable of pre-populating some item-factor combinations. For example, price data is often readily available to the system if it is linked to an online catalog. The user need not enter the price data into the three item-factor combinations corresponding to price. Other factors, for example Screen Size and Resolution may also have their item-factor combinations pre-populated by the system. The system may only be able to pre-populate some item-factor combinations for a given factor, for example if some items' information pages contain more detailed information than others. Still other factors, such as this example's user-defined "Looks Good" factor or the general "Notes" factor may not have their item-factor combinations pre-populated. The user may edit an item-factor combination, for example by clicking on the corresponding area, which may be a text-box or some other interface element designed to capture user input. FIG. 4 illustrates an example interface through which a user might edit a research note.

TABLE 1

|  | Television Model A | Television Model B | Television Model C |
|---|---|---|---|
| Price | $799.95 | $820.89 | $815.00 |
| Screen Size | 38 inches | 38 inches | 40 inches |
| Resolution | 1080 p | 1080 p | 720 p |
| Looks Good | No - I think the bezel is too wide | Yes, I like its modern look. | Not sure - need to look at more pictures. |
| Notes | I saw this at my neighbor's house. | This is my current favorite. | I need to research this model further. |

In one embodiment, the user may be prevented from altering certain item-factor combinations, such as those corresponding to factors which the system has a high degree of confidence concerning the accuracy of pre-populated data. For example, a user may be prevented from altering List Price data in order to maintain the accuracy of research notes and improve their usefulness for other users who may view them.

The system may provide the user with updated information after the note has been created. For example, the system may consider the user to be actively researching the purchase between the time when the note was created and when a purchase of a considered item is made. If a relevant change event occurs during that time, the user may be informed of it, for example by displaying an information message to the user on the research note screen the next time the user views the research note. Alternatively, the notification may appear on another personalized page, be emailed to the user, or delivered by some other messaging method. Relevant change events can include the information corresponding to a particular item-factor combination changing. For example, the price of an item being considered may change. An item's availability may change if it goes in or out of stock. A new review which is considered likely to be relevant may become available.

Relevant change events can also include the introduction of new items or factors for consideration. For example, a new model of an item being considered may be released after the note has been created. The system may detect this new model's relationship to an item currently being considered, inform the user, and provide the user with the ability to add the new model to the research note, replace the old model with the new model, or take no action. A new factor may also be detected as being relevant, such as failure rate or rate of return, in the event that information indicates a particular item to have high defect or dissatisfaction rates. The user may be informed of the suggested new factor and provided with the option to add it to the research note.

In addition to storing items, factors, and item-factor combinations, a research note can store priority information. Priority information can include a user's opinion of the importance of the factors being considered. Priorities can be expressed using any of a variety of measurements. In a simple example, such as FIG. 4, the user is provided with the option to indicate which factors are considered "key" factors. Each factor's name may have a check-box next to it, and the user can check the boxes of factors which she considers to be particularly important to making her decision. In another example, the user can rate the importance of factors according to criteria such as High, Medium, and Low, or on a numeric scale such as 1 (indicating lowest priority) to 10 (indicating highest priority). In still other examples, factors are ranked according to their relative importance. The user may be able to indicate their #1 most important factor, followed by their #2 most important factor, etc. The factors may then be arranged according to the user's priority ranking order. Priority data may be entered as numeric text, from drop-down menus, from sliding scale elements, or from other user-input elements.

In a more complex embodiment, the user is able to provide priority data corresponding to item-factor combinations. For example, a numeric scale with 1 indicating that the item has the least appealing value for that factor, and 10 indicating the item has the most appealing value for that category may be used. The system may calculate a total item recommendation score, or suggested purchase based upon item-factor combinations and factor priority data. For example, an item's total score may be computed by taking the sum of the products of each factor's priority and the factor-item combination for that item according to that factor. So, an item being evaluated under two factors, A and B, with factor priorities of 4 and 7, respectively, may have item-combination priorities of 10 and 3, respectively. This could indicate that the user considers the item to be very appealing according to factor A, but somewhat unappealing according to factor B. The item's total score could be computed as ((4*10)+(7*3)), for a total score of 61. Some users, such as corporations which must follow objective purchasing guidelines, may find such item scoring to be useful. Other users may prefer to use the research note only to gather information, while leaving the final choice calculation to their own mental process.

A system which stores detailed user priority information, such as that described in the above examples, allows improved tailoring of information presented to users. Item suggestions for future purchases and comparisons presented to a user could be informed by the user's known priorities as well as aggregate data mined from other users. An online catalog could mine priority data and resulting purchase decisions in order to discover aggregate customer trends and preferences, as will be described in more detail later.

As has been described, a research system can provide significant benefit to the user responsible for its creation, known as its author. However, the system may include a number of collaborative, social elements which benefit the author and other users. A number of users may be considering purchases similar to each others'. Former purchasers may have considered many of the same items being considered in an author's research note, and the author herself may eventually become a purchaser capable of informing other's purchases. Research note data may be valuable whether or not its author eventually completes a purchase. Accordingly, various embodiments include a number of social elements which may provide for interactions between users.

In one embodiment, a research note's author is presented with the option to make her research note publicly visible, and/or visible within the author's social network. Doing so may allow other users to save time in their own comparative decision by viewing the author's research note. The author may select from radio buttons within her research note's editing screen in order to change the note's visibility 25. The note may be kept private to only the author, may be set as publicly visible, may be set as visible only to registered users, or only to friends or social network contacts of the author. The author may also make conditional choices about her note's visibility, such as making it visible after she has made a purchase. The author may be informed that making her research note publicly visible may provide her with the benefit of obtaining other users' feedback, such as through comments. Such feedback could be useful in informing the author's purchase decision.

With research notes marked as being visible to non-author users, such users could be provided with some way to discover research notes which may interest them. A user could be provided with a hyperlink to view a research note in a variety of contexts. The online system may include a dedicated "Research Notes" section of a website in which users can seek out research notes, which may be arranged into categories based on the categories of the items they compare. Additionally or alternatively, if one or more research notes exist for a particular catalog item, the system may automatically supplement the item's detail page in the catalog with a link to each such research note, and/or or with aggregated data mined from such research notes. Other pages, such as category pages, or forums may also provide links to research notes and/or aggregated data mined from research notes.

FIG. 9 illustrates one example of how research notes can be suggested to a user for viewing. In this example, an item's detail page has been dynamically created to include suggested research notes based on item viewing history of the user 84. The system suggests research notes based on the most recently viewed item and previous items 84. The system further suggests research notes based on the most recently viewed item and other data 85.

FIGS. 5 and 6 illustrate example interfaces for viewing a research note. The interface presented in FIG. 6 may be contained in the same network resource as the interface presented in FIG. 5, or may presented in a separate network resource. Such an interface may be dynamically generated for displaying to the note's author, or some other user. Referring to FIG. 5, The interface presents helpfulness information 26, and allows the user to vote on the research note's helpfulness by selecting a "yes" or "no" option 27.

Users may be provided with the ability to provide feedback on research notes authored by others. A simple user input example is allowing non-author users to indicate whether they found the research note to be helpful 27. The system can keep track of the votes received for a given research note and use that information to determine the research note's perceived helpfulness. Referring to FIG. 6, users may also leave comments 75, 76 on a research note, for example in an area of the research note dedicated to non-author input. The author may be informed when new input is received for one of her research notes, for example by email or message within the online catalog. Such non-author comments could include text, audio, video, and hyperlinks such as links to other research notes, product reviews, or product pages. Comments could be general to the research note, or could be linked to a particular element of the research note, such as a particular item being compared in the note, or a particular factor in the note. A user may wish to leave an item-linked comment such as "I just bought Television Model C, you should look at my research note [here] and my product review for Television Model C [here]." Another user may leave a factor-linked comment specific to resolution stating "If you have a Blu-ray player, I suggest getting a 1080p model."

FIG. 6 illustrates another example of an interface for viewing a research note. This example could appear as a continuation of the dynamically generated network resource discussed in FIG. 5. The system presents user comment data 75 concerning the research note. The current user is presented with the ability to add a comment to the research note 76. The system presents tags by which the research note may be classified. Such tags may be recorded as tag data, and may be used in order to recommend research notes to users, organize research notes into categories, or for other information related purposes. The system further presents a list of similar research notes 77, and links to customer discussions 78 related to the current research note. Such discussions may relate to data stored and presented in an network forum format.

Storing users' votes concerning the helpfulness of individual research notes can allow the comparative decision system to identify more useful research notes from less useful ones. For example, on an item's details page, there may be a section containing links to research notes comparing the item to other items 77. This list of links to research notes could be sorted so that the most useful research notes are identified at the top of the list. Each hyperlink to a research note may be accompanied by a description of that research note's helpfulness. For example, a statement that "32 out of 40 users found this helpful" could indicate that a particular research note has a generally high helpfulness. Similar prioritizing of research notes, and accompanying information could appear in other locations where links to research notes are present.

Besides a particular research note's general helpfulness, the note's relevance may also be useful in determining whether to present the note to a user, and if so, how the note should be prioritized relative to other notes. A research note's relevance can be determined based on any of a number of factors. For example, the current user's item viewing history may be stored by the system 38, as was described above. The system may then determine whether any research notes compare multiple items recently viewed by the user, and may automatically expose (e.g., present a link to) such research notes. The system may also consider the helpfulness of each matching research note in selecting notes to present to the user, and/or in ranking the matching notes for display. Overlap of categories may also be considered. For example, the system may have stored information indicating that the current user has performed a significant number of page views in a particular product category. Research notes which compare items within that product category could therefore be considered of relevance to the current user. This could result in the user being provided with a hyperlink to a research note even if the note does not contain a comparison for any specific model which the current user has viewed. The user's expressed interest in the category, combined with the research note comparing items within the category could cause the research note to be considered relevant. The system could determine that the resulting relevance score, combined with a high usefulness score, indicates a high likelihood that the current user would be interested in the research note.

Further improvements in recommending research notes to a current user could be obtained through tailing the research note's helpfulness and/or usefulness scores according to the determined similarities between the current user and other users. Users who are determined to be more similar to the current user may have their usefulness opinions weighed more heavily in determining helpfulness. A research note could also be considered more relevant if it was authored by a user considered similar to the current user.

The system may provide users with an ability to follow research notes, for example by setting sending the user information concerning updates to the research note by an RSS feed, email, or other message delivery system. The system may also provide a user who is viewing a research note with the ability to create a new research note based at least in part on the viewed research note. For example, a non-author user could be presented with an option when viewing another user's research note to create their own note, and the system, upon receipt of a user action indicating selection of that option, may present the user with a research note creation screen in which some of the items, factors and/or description data is pre-populated from the earlier research note.

Figure 8:
FIG. 8 illustrates an example of a webpage allowing users to convert research note data into a product review.

After a user has purchased an item which she had previously compared in a research, the system can prompt the user to create a product review for the item based in part on data stored within the research note. This prompt could appear after a certain amount of time, for example one month after the purchase was made, or one week after the item's estimated or actual delivery date. The user may be prompted to create a product review based on the research note when reviewing the research note—for example, a new link or pop-up could appear stating: "Why not create a review for your item? Click here to build one from this research note." Alternatively the user may choose to leave a product review through a link on the product's information screen, their order history screen, or by some other route. Once the user has chosen to create a product review, the user can be presented with information based on data stored in the research note. For example, the review-creation interface, such as the one illustrated in FIG. 8, could list the factors which the user considered in comparing the item with other items, along with the purchased item's item-factor data corresponding to the factors 80. The user could then be asked to comment upon the factors, individually or collectively, based upon her actual experience with the item. The user could also be presented with simplified ways to provide factor-specific input, such as categorizing each factor as a "Pro" or a "Con" 81 using a drop-down box or radio-button interface. Numeric ratings could be used in the alternative. The system could also provide the user with an interface for entering comments related to individual criteria 82. This could be in addition to, or as an alternative to, providing the user with the ability to enter general review comments 83. For example, research note data is presented according to criteria 80, and the user is presented with the ability to rate their subsequent experience with the product based upon that criteria using a Pro/Con/Neutral analysis 81. Review comments specific to that criteria may be provided 82. General review comments may also be provided 83. The system may further allow users to remove criteria which were included in the research note, so that such criteria do not appear in the review. Additionally or alternatively, the system may allow users to add new criteria, and/or change the data values associated with existing criteria.

The user may also be reminded of the priority data which she entered into the research note. As explained above, priority data can include priorities for a factor generally (such as being a "key" factor), and can also include priority values indicating how a particular item is perceived as scoring for that factor. In creating the product review, the user could be asked to confirm whether her post-purchase experience confirms her pre-purchase priorities, or whether she would change the priority for factors and/or specific item-factor combinations after having used the item. In the described embodiment, the system would thus capture valuable information comparing pre-purchase expectations with post-purchase experiences. Such information could be presented to users considering similar purchases. For example, the research note could have post-purchase information generated from the product review. The research note may also contain a link to the user's product review so that interested users can view additional information.

In creating a product review informed by her previous research note, the user may be asked additional questions to confirm whether decisions made during the research process are believed to be accurate in light of having used the product. For example, the relevance and accuracy of reviews contained within the research note could be given a score for accuracy.

The system may store data indicating that a research note's author has purchased an item described in the author's research note. The system may also store data indicating that a research note's author has created a product review for an item described in the author's research note. The system may provide information, to users viewing a research note, that the note's author has purchased an item from the note. The system may provide information concerning the review for a product in the research note, within a page related to the research note, such as through providing a hyperlink to the product review, the title of the product review, or a portion of the product review, within the page related to the research note. The system may further store data indicating that a product review's author has created a research note in part for the reviewed product, and present users viewing the review with information related to the research note, such as a hyperlink related to the research note, the research note's title, or a portion of the research note itself.

Research notes may continue to be of use to users long after the notes are created. However, criteria which affected the purchase decision may have changed between the time the research note is completed and the timeit is subsequently viewed by another user. For example, a product's price may have changed. Alternatively, a product may be somewhat different, even if the same model number is used to identify the item. For example, a cell phone may ship with a newer version of its operating system installed and the new version may correct problems mentioned as detracting factors in previous research notes. In one embodiment, the comparative decision system records information concerning compared items at a specific time, such as when the purchase decision was made, when the particular item was added to the research note, or the last time that the user appeared to have researched that particular item in updating the research note. By storing this historic information, the system is able to provide subsequent viewers with information explaining the context of the purchase decision.

Historic information can be presented to a viewing user in a variety of ways. The user could see the research note displayed primarily as it was originally authored, with system-generated update information dispersed throughout where appropriate. For example, if the research note was made when a cell phone which it compares came equipped with Android version 2.1 operating system, but the cell phone now ships with version 2.2, a note could be added to the item-factor cell corresponding to Operating System for that item. Alternatively, some item-factor cells can have their present value displayed as the primary data point, with a note to the user that the corresponding value was different at the time of the user's decision or purchase. For example, it may be important to show users the current price for items listed in a research note. Accordingly, the current price could be displayed in a larger font size, with the price-at-purchase listed in a smaller font, different color, or through some other item style to distinguish it from the current price and draw the user's attention to the difference.

Capturing historic changes for items' compared values can be useful by enabling the system to extract aggregate trends based upon such historic changes. This can be especially useful because user's considering a purchase often consider not only an item's price, but also the differences between its price and the prices of competing items. Because the system can record this type of difference-data, it allows for mining of more detailed historic price trends than sales data in the absence of comparison data. For example, records could be mined for all instances of a particular item being purchased. That data could be plotted so that the frequency or likelihood of the item being purchased is represented as a function of the item's price at the time it was being considered for purchase. This could expose hidden consumer criteria, such as price elasticity for specific items or classes of goods. Data mined from users' priority data may show that most users state that price is an extremely important factor, however data mined from purchase history could indicate that during a time in which prices increased, purchases also increased. Such an initially perplexing observation may be informed by historic differential data mining. Data may be further mined which indicate the historic differences in price between the item being analyzed and its competing alternatives (for example, based on those products frequently being compared in research notes to the current product). Plotting this price differential could expose that, although the item's price may have increased during the period in question, it remained the lowest-priced option amongst its common alternatives. This fact may explain the increase in sales.

In another embodiment, the research note system is capable of mining additional information from research note data. The system mines aggregate information concerning any numeric relationship amongst research notes. For example, the system could contain a data mining software module which executes an algorithm in order to mine aggregate information concerning user priority data for a specific purchasing factor, such as average review popularity, for a particular category of items, such as travel destinations in South America. The data mining process could begin by identifying all research notes which satisfy the criteria for the current mining operation—research notes containing one or more South America travel destinations as items being compared, containing average review popularity as a factor according to which the items are compared, and indicating that a decision was made on a particular travel destination (or, in the alternative, that a rating, total score, or priority ranking was input or calculated for the compared items). As explained above, the comparative decision system may store historic records of what each item's average review popularity was at the time that a research note was created or a decision amongst compared items was made. Alternatively or additionally, all research notes which satisfy the criteria could be counted as the number total number of research notes containing one or more South America travel destinations, regardless of whether a particular note's author included average review popularity as a factor.

Upon gathering the set of research notes satisfying the criteria, the trend mining module could then count the number of occurrences in which a particular average review rating (for example: 5 out of 5 stars, or a range such as a total score between 9.5 and 10 on a scale of 1 to 10) was given for a South America destination and some indication of user choice or preference was made. For example, the module could count the number of instances where the South America destination with that rating was selected, and the number of instances where the South America destination with that rating was not selected. An average selection rate could then be calculated for this particular average review rating, for example:

$$AverageSelectionRate=num\text{-}notes\text{-}selecting/(num\text{-}notes\text{-}selecting+num\text{-}notes\text{-}not\text{-}selecting)$$

The module could collect similar aggregate data for all remaining average ratings and compute their average selection rate for average review rating. The resulting data could be indicative of the importance of average review rating data for users considering travel destinations in South America. The system could plot the data in a graphical representation, with average review rating as the independent variable, and average selection rate as the dependent variable. A correlation factor between the two factors could then be calculated in order to quantify the extent to which average selection rate influences users' decisions and priorities in evaluating South America destinations.

In an embodiment in which the trend mining module calculates trends based upon a user's rating or ranking of a particular factor, average selection rate may be replaced by a related value indicative of preference, such as average priority influence. This value could be calculated so that instances in which a strong priority was given for the average user review factor increase the average priority influence factor, while instances in which a weak priority was given decrease the average priority influence factor. In an embodiment in which users indicate priority by flagging "key" factors, the mining module may count the number of number of research notes in which a South America travel destination is listed and average review rating is flagged as a key factor. It will be understood that the term "key" does not indicate any importance of this feature in practicing the invention, but instead indicates that a user of one embodiment of the disclosed system has indicated a preference for that feature, relevant to the compared items. That number could be taken as a fraction of the total number of research notes in which a South America travel destination is listed.

Data could also be mined in order to categorize users according to a set of criteria so that a given user's recorded actions (such as research note data, review ratings, etc.) are be weighed according to the degree of similarity which that given user has to the current user for whom information is being calculated. For example, a user categorization module could mine a particular user's research note data across all research notes the user has authored. The system uses this data in order to determine whether categorization tags, such as "likes electronics," "prefers very new models," "less price-sensitive," and "usually researches 5 or more alternatives" should be applied to the user. The system can store data corresponding to such tags privately. The system can apply tags on the basis of prior sales history instead of, or in addition to research note data. The system could use user categorization tags in order to provide a current user with a suggested research note based in part on the note's author being similar to the current user according to a number of categorization tags.

User categorization could also improve specific items which are suggested to the current user. For example, the system may present embed information within the user's own research note that is unique to the user, when the user views that note, such as suggesting to the user additional items to add to the note. The system could present a section of the webpage stating "72% of users like you also consider this model when comparing items in your research note," with a link, image, and/or name of the suggested model appearing. The system could also present suggestions based upon a user's own categorization, without needing to compare the user's categorization to that of other users. For example, the user categorization module may have tagged the user with a "prefers very new models" tag based on past purchases and research note data. If a new model for an item that the user comparing should be released, this tag could increase the likelihood that the user will be informed of it, or could increase the prominence of the statement informing the user.

The system may also contain a research note popularity mining module which mines data indicative of a given item's popularity for inclusion in comparisons. The module may mine the frequency with which research notes in general, or research notes in a particular category of the given item, include the given item as one of their items being compared. The system can analyze and present a representation of this information, for example in a data plot. Alternatively or additionally, the system may calculate summary information such as "this item is compared 18% less often in its category's research notes today than it was three months ago." The system could compare this type of item popularity against information summarizing the item's purchase popularity. If the system detects a statistical difference, such as an item maintaining popularity for comparison purposes, but losing popularity for purchases, the system may suggest or perform additional data mining analyses to determine the possible cause of the statistical difference. For example, the system may produce information revealing that, although the given item still has high brand visibility, recent customers have tended to purchase a new alternative after comparing it to the given item. Retailers, distributors, or manufacturers may find such information helpful, for example in pricing or designing their products. Alternatively, or additionally, the system may adjust prices in response to such calculations.

User reviews are often valuable to potential customers in deciding amongst alternatives. For some products or categories of products, there may be specific websites, publications, online forums, or other review-focused resources which are recognized as the leading authority for producing high-quality product reviews. The research note system may allow users to provide links or other information within their research notes indicating which review or resource they particularly relied upon in making their decision. A priority resource mining module may collect and analyze aggregate data in order to determine which review resource are commonly recognized as the most helpful. For example, the module could count the number of times that a given review resource is mentioned as being a factor used in a research note. The review resource could be identified, for example, as a product review at a specific URL, or as a domain name for a review website containing a number of reviews. The domain name could be identified within larger URL's so that user entries which point at different reviews within the website are all counted as instances in which the website more generally was cited as a valuable resource in making a purchase decision.

Although the research note item has generally been described in terms of comparing individual items against each other, the invention is not limited to these embodiments. In an alternate embodiment, the user may compare one combination of items being considered for purchase against other combinations of items. For example, a user may be considering purchasing a new digital camera along with a 4 gigabyte memory card compatible with the camera, an underwater housing for the camera, and a carrying case for the camera. The system may present the user with the ability to create a bundle research note in which each column represents a combination of camera, memory card, underwater housing, and carrying case. This may be helpful to the user because compatibility limitations will cause the user's product selection in one item category may dictate or at least influence her product selection in another category. For example, two of the cameras which she is considering may each only have one underwater housing available, while a third camera has two underwater housings available. The system may represent this by four bundles for comparison: one each for the first two cameras in combination with their underwater housing, and two for the third camera—one with each of its possible underwater housings. The system may later store information as in response to the user's decision to add to the bundle by including a flash memory card. The system may provide guidance to the user on making additions to bundles being compared. For example, suggestions could be based on other users comparing the items together in bundles, other users having purchased the items together, or item details indicating compatibility. For example, the system could suggest a miniSD flash memory card for a camera which only accepts such cards, and suggest an xD flash memory card for an alternative camera which only accepts xD cards. In another example, shown in FIG. 7, tablet devices a research note system stores data comparing tablet devices. The research note system stores data representing bundles 79 and allows users to buy bundles of items together through presenting "Buy Both" or "Buy All 3" buttons. The system displays information concerning item bundling, which is well known in the art, and allows customers to add bundles of items to their electronic catalog shopping cart for purchase. FIG. 7 also illustrates an example of a system providing users with the ability to purchase individual items compared within a research note, by presenting such users with an "Add to cart" button associated with each compared item.

By comparing bundles against each other, the user may be able to better recognize that a product which previously appeared to be the best choice according to its own factors may be less desirable when considered in the total context of a bundle. For example, Camera A may appear more to be a more optimal purchase than Camera B, but Camera A may only be compatible with an underwater housing having a higher price and smaller maximum diving depth than an underwater housing available for Camera B. The research note could include a "total price" factor for comparison, which lists the combined price of all items within the bundle. Other factors could be specific to individual items within the bundle, such as the camera's megapixel rating, or the underwater housing's maximum dive depth rating.

The system may provide users viewing a research note with a convenient way to purchase an item within the research note. For example an "Add to Cart" button could appear below each item's image or description in the research note. Similarly, in a research note containing a bundle, a button to "Add All 3 Items to Cart" could appear under the bundle's image or description in the research note. Alternatively a research note may compare individual items, but the system may recommend bundles which some of the individual items may be purchased in. Or, the research note author may create the note comparing individual items, but may include bundles as a factor for comparison. This could provide a shortened way of illustrating the user's preferred bundles for each of the compared items, without providing detailed comparisons of the other bundled items' features.

The system may mine research note data in order to detect item bundling trends. For example, a bundle mining module may count all instances in which Camera A was compared in a research note. The bundle mining module may then count the number of instances in which Memory Card X was compared in a bundle with Camera A, and the number of instances in which Memory Card Y was compared in a bundle with Camera A. If research note authors tend to bundle Memory Card Y with Camera A sufficiently often, the system may record that information and suggest that customers purchase the two items together. The system could present this suggestion could appear on an item's information page, or on pages corresponding to research notes which contain one of the two items. If Memory Card Y was found to have a higher correlation to Camera A than Memory Card X had, then users considering purchasing Memory Card X in a bundle with Camera A may be presented with a suggestion to consider Memory Card Y instead, for example "58% more user purchasing Camera A also purchase Memory Card Y, compared to Memory Card X. Click here to add a Memory Card Y bundle to your research note."

Figure 10:
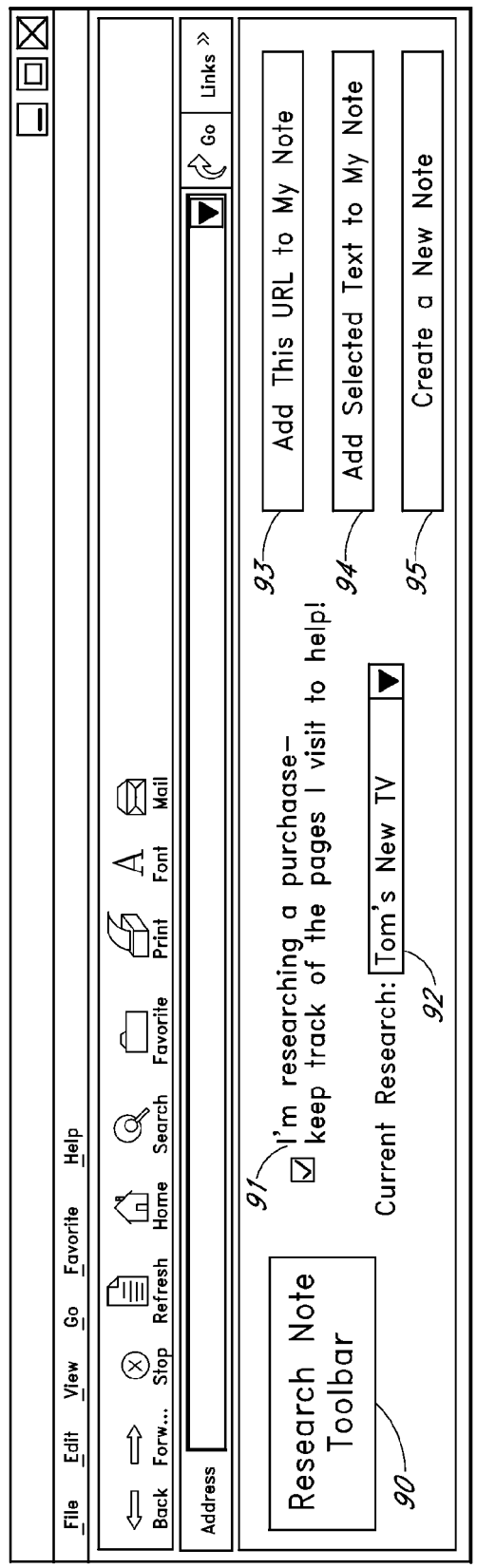
FIG. 10 depicts an illustrative user interface of a research note toolbar for a web browser.

The system may track user's actions within a website or group of websites with which the system is integrated. For example, the system may record events in which a user views an item detail page, submits a search query, or views research notes or product reviews. Referring to FIG. 10, the system may also include an external data gathering component, such as a toolbar installed within a user's web browser 90. Such a toolbar may be designed for any of a number of web browser applications, such as Internet Explorer, Mozilla Firefox, Google Chrome, Apple Safari, Opera, or other web browsers. The toolbar may identify itself as a research note toolbar 90, and provide the user with the ability to turn research note tracking on and off 91. The system presents the user with the ability to further specify which research note is being actively researched using a drop-down box 92. The system provides buttons for adding the currently viewed URL to the research note 93, or the text which is currently selected in the web browser to the research note 94. The system may also present the user with the ability to initiate the creation of a research note using a button or other selectable item of the research note toolbar. Upon receiving input indicating that the user has selected this option, the system may present the user with a research note template as described above, and may further optionally pre-populate the research note creation with information based upon the user's web browsing. The external data gathering component can assist the user in creating more complete, informative research notes by allowing the system to capture behavior occurring in any resource viewed through the web browser, including websites which are not integrated with the system. For example, the browser toolbar may provide the user with the ability to turn research note data gathering on or off 91. When research note gathering is on, the toolbar may allow the user to specify which of the user's research notes she is currently researching. This could be accomplished by a drop-down menu box populated with the names of research notes associated with the user's account 92.

When the system stores data indicating that research note gathering is activated, the system collects relevant information and associates that information with the active research note. For example, the toolbar may detect that the user is viewing a product on another online catalog. The system could inform the user that the same item is available through the online catalog integrated with the research note system. The system could ask the user whether she would like to add the item to her research note, or may automatically do so for the user. The research note's new entry, corresponding to the new item, may contain a link to the page where the item was initially viewed. In another embodiment, there is no link made visible, or the link is only made visible if the item is not available through the online catalog integrated with the research note system. Alternatively or additionally, the new item may be placed in a bundle with an existing item in the research note.

The toolbar may also detect when a user is reading a review website. This could occur through identifying keywords in the displayed webpage, through identifying the current domain as one associated with item reviews, through metadata on the webpage, or through some combination of factors. The system may provide a user with the ability to indicate that the currently-viewed website includes a review relevant to the research note. For example, the toolbar may include a button labeled "tag this review to my note." The toolbar may present the user with other choices, which may be presented through buttons. For example, the toolbar may allow the user to add the current URL to the research note 93, or add the text currently selected within the web browser to the research note 94.

Figure 11:
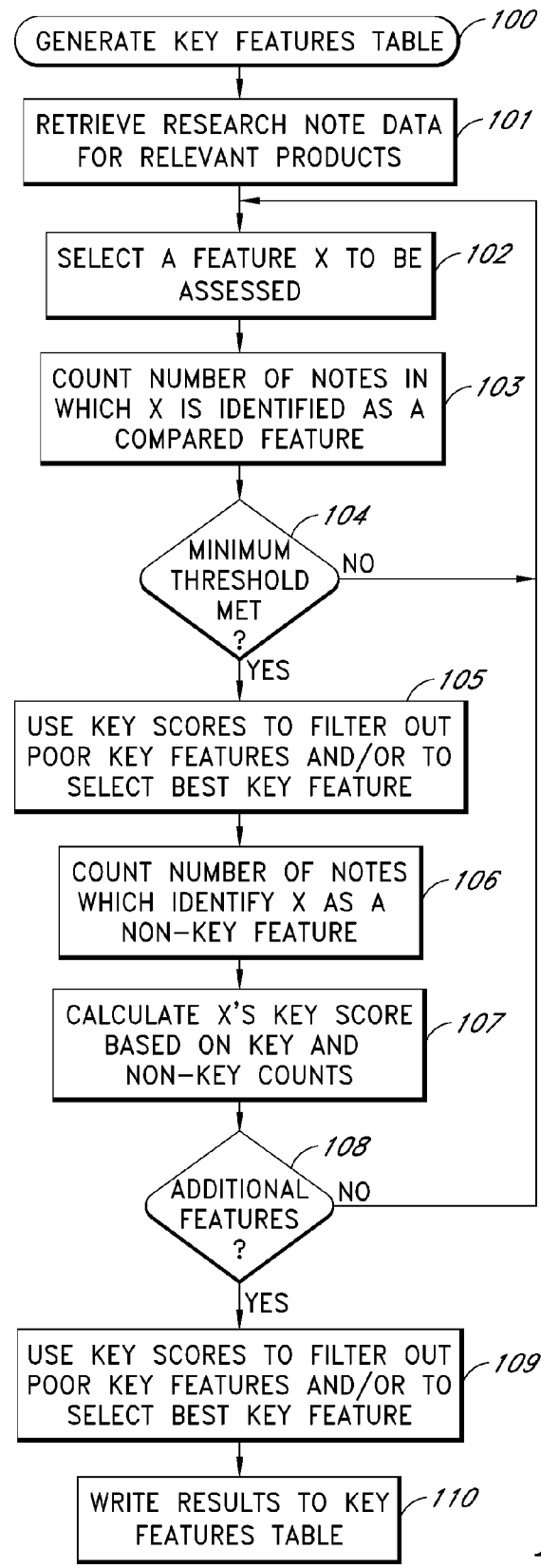
FIG. 11 depicts an illustrative data mining method for using collected research decision data to identify features frequently listed by users as key features for their decision making.

The system may also include a number of modules which perform data mining operations. Referring to FIG. 1, this may be performed by the note mining/aggregation module 54 of the research note service 50. For example, referring to FIG. 11, a method for determining which features are commonly identified as key features is disclosed 100. The system performs the method by retrieving research note data for relevant products 101. Such products may be determined based on category listing, by their being referenced within one or more research notes, or by other criteria. The system them selects a feature to be assessed for aggregate importance across the research notes 102. The system may select features based on their prevalence within research notes, may iterate through all such features, or may perform some other method for determining which feature to select. Next, the system counts the number of notes in which the selected features is identified as a compared feature 103. The system checks if the minimum threshold of research notes identifying the feature is met 104. If the threshold is not met, a new feature may be selected and the process repeated, or the process may end. If the minimum threshold is met, the system may optionally key the scores to filter out pore key features and/or to select the best key features 105. The system may then count the number of notes which identify the current feature as a non-key feature 106. The system may then calculate the aggregate usefulness of the current feature based upon the key and non-key counts found amongst the collected research notes 107. If there are additional features to mine aggregate information for, the system may repeat 108. Otherwise, the system may optionally filter out poor key features and/or select the best key features 109, and write the results of the data mining to a key feature table 110. As described above, a number of different data formats may be used to indicate the relevance of a given feature. For example, a boolean flag as to a feature being "key" may be used, a high-medium-low rating system may be used, a numeric rating system may be used, or some other system may be used. The discussed data mining system may be implemented to operate in conjunction with the implemented key system.

Figure 12:
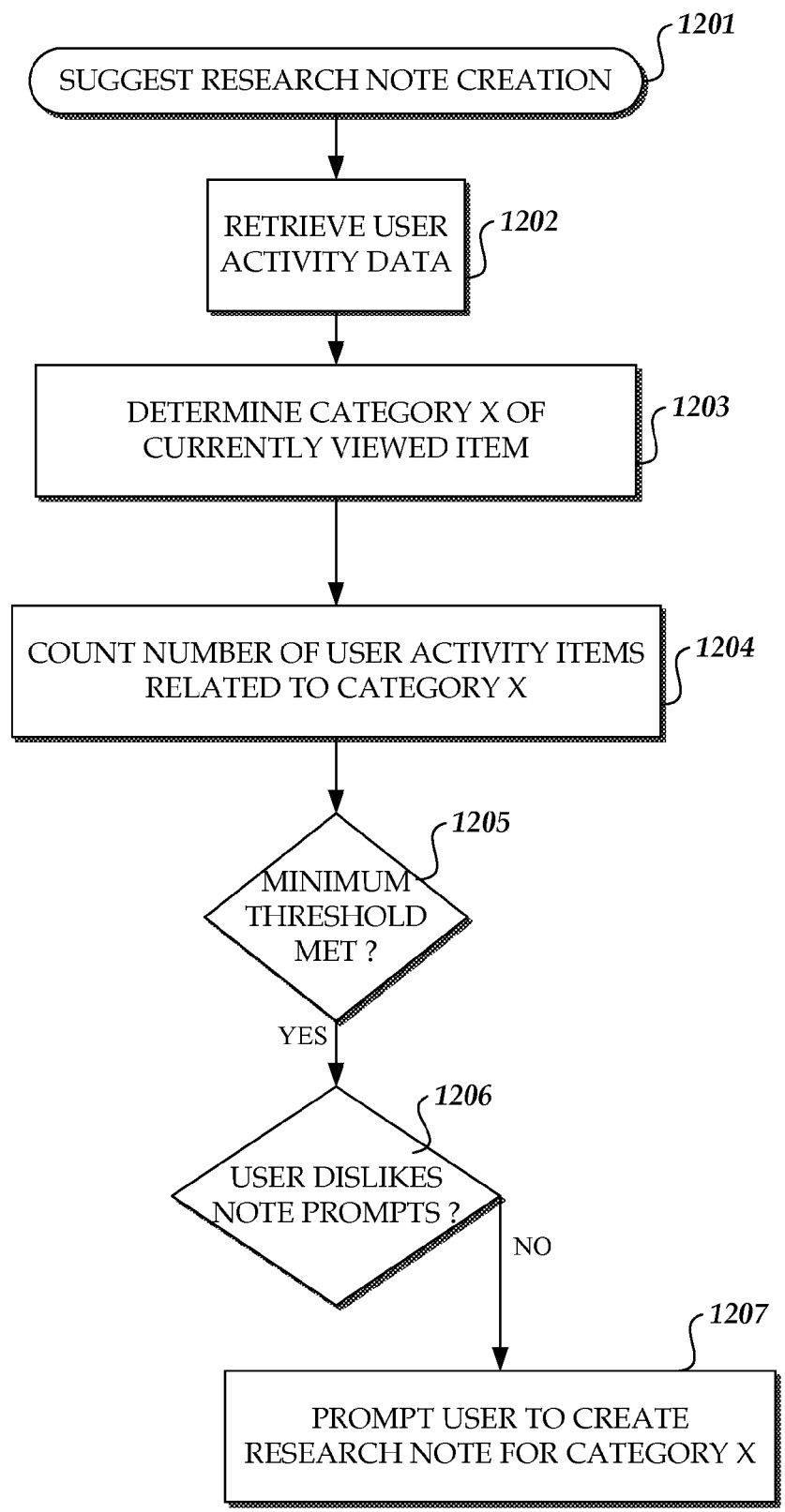
FIG. 12 depicts an illustrative research note creation recommendation method for determining whether a user should be prompted to create a research note.

The system may perform other operations as well. Referring to FIG. 1, a research note detection process may be performed by a research note detection module 51 of the research note service 50. Referring to FIG. 12, a method for suggesting research note creation is disclosed 1201. Such a method may be performed in order to detect when research is being conducted, so that the appropriate users may be suggested with the creation of research notes at the appropriate times. The system may retrieve user activity data 1202, and determine the category of an item which the user has currently or most recently requested information for (such as by accessing the item detail page) 1203. The system may then count the number of user activity items for the particular user which relate to other items in the same category 1204. In other embodiments, other steps may be performed in order to determine the frequency of research related activities. For example, the system may access stored search data to determine what information users have searched for. The system may also access review data. User activity data may include data collected by a research note toolbar. In counting the number of user activity items related to the particular category, the system may optionally only consider items relating to user activity that is sufficiently recent, or may weigh more recent activity higher than less recent activity. The system may then check whether a minimum threshold of user activity items has been met 1205. The threshold may be preset, dynamic, or adjustable. If the threshold has been met, the system may then check whether the current user dislikes being prompted for the creation of research note 1206. If the user does dislike such prompts, the system may optionally still record that research is being conducted, but may not prompt the user to create a research note. If stored data indicates that the user does not dislike research note prompts, then the system may prompt the user to create a research note for the particular category and/or specific item recently viewed 1207.

Figure 13:
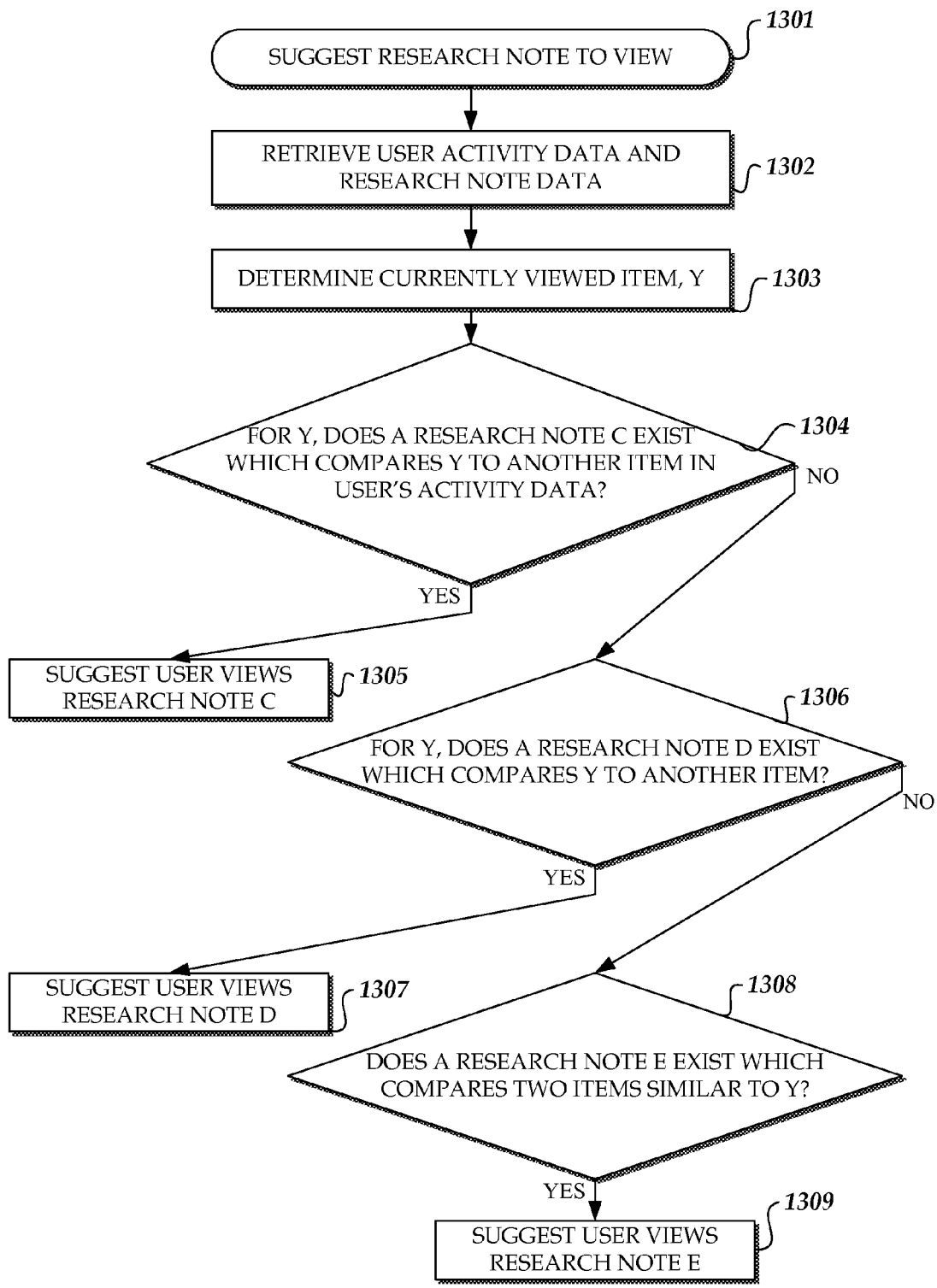
FIG. 13 depicts an illustrative research note view suggestion method for determining whether a user should be presented with a research note to view.

The research note service 50, disclosed in FIG. 1, may perform a number of other processes related to research notes. For example, FIG. 13 discloses a method of suggesting research notes to a user to view 1301. The system retrieves user activity data and research note data 1302 and determines the item which the user is currently, or has most recently, viewed 1303. Such a determination may be made based upon, for example, the system's transmittal of an item detail page for that item to the user. The system then determines whether a research note exists which compares that item to another item in the user's activity data 1304. This may seek to identify a research note which may be of high relevance to the user's current item comparisons. If such a research note is found, the system may suggest that the user views the research note 1305, for example by dynamically including a link to the research note embedded within a network resource which it transmits to the user. If no such research note is found, the system next determines whether a research note exists which compares the item to another item, even if that other item is not within the user's activity data 1306. If such a research note is found, the system may suggest that the user views the research note 1307, similar to the manner described above. If no such research note is found, the system then performs a "next-best" analysis in which it determines whether a research note exists which compares two items which are both considered similar to the item in question. If such a research note is found, the system may suggest that the user views the research note 1309, similar to the manner described above. In other embodiments, the system may consider degrees of similarity between items in determining which research notes to suggest to the user, or the priority ranking of those research notes to suggest to the user. In another embodiment, the user may be presented with data which indicates the strength of the recommendation to view the research note. For example, the system could transmit to the user, embedded within a network resource, the information that "28% of users considering this item viewed this research note:" or "14 other users have recently considered this research note when making a comparison similar to yours."

Other data mining and/or aggregation methods may be performed by the system. For example, the system may calculate, for users who created research notes comparing two items, what percentage of those users ultimately purchased one particular item. The system may also calculate the number of research notes comparing two items which indicate a preference for a particular item. The system may analyze users' purchase histories in order to determine this information, for example by verifying if an item from the research note was ultimately purchased, and if so, which item.

Research notes have been described thus far as largely individual processes. Some embodiments have discussed user interaction, for example allowing non-author users to leave comments on a research note, or vote for a research note's helpfulness. In other embodiments, authorship itself is a collaborative, group-based concept. For example, the system could permit a research note to be designated as a group-edited note. The note may be edited by a group of users, such as a group list of users, or all users who are the initial author's friends or social network. The system may also permit a note to be edited by any user. The system may use a wiki-style tracking and editing system, for example in order to record all changes made and allow for reversion to a prior version when a more recent version is found to be less desirable.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

What is claimed is:

1. A method comprising:
   monitoring item viewing activities of a user as a the user browses an electronic catalog of items and recording item viewing data reflective of said item viewing activities;
   storing research note data corresponding to a plurality of research notes, wherein individual research notes are created at least in part by an author and comprise item data reflective of a plurality of items from said electronic catalog, which said author has compared, and wherein said plurality of research notes were created at least in part by a plurality of authors;
   analyzing said item viewing data to determine whether said user has viewed a first item and a second item for which a research note exists, said research note comprising item data reflective of said first item and item data reflective of said second item, wherein said research note was created at least in part by an author who is not said user; and
   exposing at least a portion of the research note, data extracted from the research note, or at least a portion of the research note and data extracted therefrom, to said user via by including the portion of the research note, data extracted from the research note, or at least a portion of the research note and data extracted therefrom as content within one or more pages of said electronic catalog that are transmitted to a device associated with the user by a service associated with the electronic catalog;
   said method performed in its entirely by a computer system that provides network-based access to the electronic catalog.

2. The method of claim 1, wherein one or more of said research notes further comprises factor data comprising a description identifying a feature used in comparing items, and item-factor data comprising a value attributed to that feature for a particular item being compared.

3. The method of claim 1, wherein exposing at least a portion of the research note, data extracted from the research note, or at least a portion of the research note and data extracted therefrom, to said user comprises exposing a hyperlink related to said research note to said user.

4. The method of claim 1, wherein exposing at least a portion of the research note, data extracted from the research note, or at least a portion of the research note and data extracted therefrom, to said user comprises exposing a title of said research note to said user.

5. A method comprising:
   monitoring item viewing activities of a user as a the user browses an electronic catalog of items and recording item viewing data reflective of said item viewing activities;
   storing research note data corresponding to a plurality of research notes, wherein individual research notes are created at least in part by an author and comprise item data reflective of a plurality of items from said electronic catalog, which said author has compared, and wherein said plurality of research notes were created at least in part by a plurality of authors;
   analyzing said item viewing data to determine whether said user has viewed a first item and a second item for which a research note exists, said research note comprising item data reflective of said first item and item data reflective of said second item, wherein said research note was created at least in part by an author who is not said user;
   exposing at least a portion of the research note, data extracted from the research note, or at least a portion of the research note and data extracted therefrom, to said user by including the portion of the research note, data extracted from the research note, or at least a portion of the research note and data extracted therefrom as content within one or more pages of said electronic catalog that are transmitted to a device associated with the user by a service associated with the electronic catalog;
   determining, for said first item and said second item, and said research note, a measurement at least approximating a frequency with which other users viewing said first and second item have also viewed said research note; and
   exposing said determined frequency to the user;
   said method performed in its entirely by a computer system that provides network-based access to the electronic catalog.

6. A system comprising one or more computing devices configured to implement:
   an activity monitoring system which monitors item viewing activities of a user as a the user browses an electronic catalog of items and records item viewing data reflective of said item viewing activities;
   a data storage system storing research note data corresponding to a plurality of research notes, wherein individual research notes are created at least in part by an author and comprise item data reflective of a plurality of items from said electronic catalog, which said author has compared, wherein said plurality of research notes were created at least in part by a plurality of authors;
   an activity analysis system which analyzes said item viewing data to determine whether said user has viewed a first item and a second item for which a research note exists, said research note comprising item data reflective of said first item and item data reflective of said second item, wherein said research note was created at least in part by an author who is not said user; and
   a research note exposure system which exposes at least a portion of the research note, data extracted from the research note, or at least a portion of the research note and data extracted therefrom, to said user by including the portion of the research note, data extracted from the research note, or at least a portion of the research note and data extracted therefrom as content within one or more pages of said electronic catalog that are transmitted to a device associated with the user by a service associated with the electronic catalog.

7. The system of claim 6, wherein one or more research notes further comprises factor data comprising a description identifying a feature used in comparing items, of items are compared, and item-factor comprising a value attributed to that feature for a particular item being compared.

8. The system of claim 6, wherein exposing at least a portion of the research note, data extracted from the research note, or at least a portion of the research note and data extracted therefrom, to said user comprises exposing a hyperlink related to said research note to said user.

9. The system of claim 6, wherein exposing at least a portion of the research note, data extracted from the research note, or at least a portion of the research note and data extracted therefrom, to said user comprises exposing a title of said research note to said user.

10. A system comprising one or more computing devices configured to implement:

an activity monitoring system which monitors item viewing activities of a user as a the user browses an electronic catalog of items and records item viewing data reflective of said item viewing activities;

a data storage system storing research note data corresponding to a plurality of research notes, wherein individual research notes are created at least in part by an author and comprise item data reflective of a plurality of items from said electronic catalog, which said author has compared, wherein said plurality of research notes were created at least in part by a plurality of authors;

an activity analysis system which analyzes said item viewing data to determine whether said user has viewed a first item and a second item for which a research note exists, said research note comprising item data reflective of said first item and item data reflective of said second item, wherein said research note was created at least in part by an author who is not said user; and a research note exposure system which exposes at least a portion of the research note, data extracted from the research note, or at least a portion of the research note and data extracted therefrom, to said user by including the portion of the research note, data extracted from the research note, or at least a portion of the research note and data extracted therefrom as content within one or more pages of said electronic catalog that are transmitted to a device associated with the user by a service associated with the electronic catalog;

an item popularity determination system which determines, for said first item and said second item, and said research note, a measurement at least approximating a frequency with which other users viewing said first and second item have also viewed said research note; and a popularity exposure system which exposes said determined frequency to the user.

* * * * *

UNITED STATES PATENT AND TRADEMARK OFFICE
CERTIFICATE OF CORRECTION

PATENT NO. : 8,533,052 B1  
APPLICATION NO. : 12/950861  
DATED : September 10, 2013  
INVENTOR(S) : Rajyaguru et al.

Page 1 of 1

It is certified that error appears in the above-identified patent and that said Letters Patent is hereby corrected as shown below:

In the Claims

In column 21 at line 30, after "as" delete "a".

In column 21 at line 51, after "user" delete "via".

In column 21 at line 62, change "comprises" to --comprise--.

In column 22 at line 10, after "as" delete "a".

In column 22 at line 48, after "as" delete "a".

In column 23 at line 9, change "comprises" to --comprise--.

In column 23 at line 10 (line 3 of claim 7), after "items," delete "of items are".

In column 23 at line 11 (line 4 of claim 7), delete "compared,".

In column 23 at line 26, after "as" delete "a".

Signed and Sealed this  
Twentieth Day of May, 2014

Michelle K. Lee  
*Deputy Director of the United States Patent and Trademark Office*